(12) United States Patent
Qiu et al.

(10) Patent No.: US 12,510,238 B1
(45) Date of Patent: Dec. 30, 2025

(54) MULTI-SIDED WORK LIGHT AND MAGNETIC VALVE CONTROL SYSTEM AND CONTROL METHOD THEREOF

(71) Applicant: NINGBO FUTAI ELECTRIC LIMITED, Zhejiang (CN)

(72) Inventors: Fujun Qiu, Zhejiang (CN); Guohui Chen, Zhejiang (CN); Yuanlong Ye, Zhejiang (CN); Min Pang, Zhejiang (CN); Kejie Huang, Zhejiang (CN)

(73) Assignee: NINGBO FUTAI ELECTRIC LIMITED, Ningbo (CN)

( * ) Notice: Subject to any disclaimer, the term of this patent is extended or adjusted under 35 U.S.C. 154(b) by 0 days.

(21) Appl. No.: 19/008,574

(22) Filed: Jan. 2, 2025

(30) Foreign Application Priority Data

Oct. 14, 2024 (CN) .......................... 202411433822.9
Oct. 14, 2024 (CN) .......................... 202422483318.1

(51) Int. Cl.
| | | |
|---|---|---|
| *F21V 23/04* | (2006.01) | |
| *F21L 4/02* | (2006.01) | |
| *F21L 4/04* | (2006.01) | |
| *F21V 7/00* | (2006.01) | |
| *F21V 21/096* | (2006.01) | |
| *F21V 21/30* | (2006.01) | |
| *F21V 31/00* | (2006.01) | |
| *F21Y 113/20* | (2016.01) | |

(52) U.S. Cl.
CPC .......... *F21V 23/0428* (2013.01); *F21L 4/025* (2013.01); *F21L 4/045* (2013.01); *F21V 7/0066* (2013.01); *F21V 7/0075* (2013.01); *F21V 21/0965* (2013.01); *F21V 21/30* (2013.01); *F21V 23/0442* (2013.01); *F21V 31/005* (2013.01); *F21Y 2113/20* (2016.08)

(58) Field of Classification Search
CPC .... F21V 23/048; F21V 7/0066; F21V 7/0075; F21V 21/0965; F21V 31/005; F21V 23/0442; F21V 21/30; F21L 4/025; F21L 4/045; F21Y 2113/20
USPC .......................................................... 362/205
See application file for complete search history.

(56) References Cited

U.S. PATENT DOCUMENTS

| | | | | |
|---|---|---|---|---|
| 6,179,431 B1 * | 1/2001 | Chien | ....................... | F21L 4/02 |
| | | | | 362/802 |
| 6,435,689 B2 * | 8/2002 | Pitts | ......................... | F21V 9/32 |
| | | | | 362/208 |
| 7,492,063 B2 * | 2/2009 | Bayat | ................... | H05B 45/385 |
| | | | | 307/115 |
| 9,739,467 B1 * | 8/2017 | Lehman | ................... | F21L 4/04 |

* cited by examiner

*Primary Examiner* — Laura K Tso
(74) *Attorney, Agent, or Firm* — Che-Yang Chen

(57) ABSTRACT

A multi-sided work light includes a light head system, a light body system and a magnetic valve control system, the light body system includes a side lighting assembly, a lamp body component and a power supply component, the light head system and the side lighting assembly are connected to the lamp body component, the power supply component is electrically connected to the side lighting assembly and the light head system, the magnetic valve control system is arranged to control operation of the light head system and the side lighting module through a rotation operation.

20 Claims, 14 Drawing Sheets

# MULTI-SIDED WORK LIGHT AND MAGNETIC VALVE CONTROL SYSTEM AND CONTROL METHOD THEREOF

CROSS REFERENCE OF RELATED APPLICATION

This application is a non-provisional application that claims priority under 35 U.S.C. § 119 to China application number CN202411433822.9, filing date Oct. 14, 2024, wherein the entire content of which is expressly incorporated herein by reference.

BACKGROUND OF THE PRESENT INVENTION

Field of Invention

The present invention relates to technical field of work light manufacturing, and more particular to a multi-sided work light and its magnetic valve control system and control method thereof.

Description of Related Arts

Flashlights are widely used in industrial production and daily life due to their small size and easy portability. However, with the improvement of people's living standards, people's demand for lighting fixtures is no longer a single lighting mode, but also pursues quality life. There are always demands when working on outings, wilderness adventures, rail sites, diving and other special occasions. Especially in the process of working at night, coupled with some bad weather and environments, people may need a work light with good waterproof performance, multiple lighting angles, easy operation, and can be fixed. However, it is difficult for current flashlights to meet all these needs, especially in terms of waterproofing and easy operation, it cannot meet the needs of many occasions. Therefore, there is a need for a work light that is better waterproof and easy to operate.

SUMMARY OF THE PRESENT INVENTION

The invention is advantageous in that it provides a multi-sided work light and its magnetic valve control system and control method, wherein through a control ring magnetic valve control system, the multi-sided illumination of the work light and the conversion between different lights can be easily realized, and the practicability is strong. The structure is simple, easy to operate and easy to use.

Another advantage of the present invention is to provide a multi-sided work light and its magnetic valve control system and control method, wherein the work light has good waterproof properties and is suitable for use in various situations such as diving.

Another advantage of the present invention is to provide a multi-sided work light and its magnetic valve control system and control method, wherein the mutually cooperative structure of the sealing assembly and the magnetic valve control system enables the multi-sided work light to have good waterproof performance.

Another advantage of the present invention is to provide a multi-sided work light and its magnetic valve control system and control method, wherein the work light can adjust the illumination surface. By rotating and operating with one hand, pressing and rotating can be performed at the same time, that is to say, it can be controlled at the same time for changing lighting modes and switching between different lights.

Another advantage of the present invention is to provide a multi-sided work light and its magnetic valve control system and control method, which have reasonable structural design, small size, and is easy to carry and transport.

According to one aspect of the invention, a multi-sided work light is provided, comprising:

a light head system;

a light body system, the light body system comprises a side lighting assembly, a lamp body component and a power supply component, the light head system and the side lighting assembly are connected to the lamp body component, the power supply component is electrically connected to the side lighting assembly and the light head system to provide power to the light head system and the side lighting assembly; and a magnetic valve control system which is arranged to control operation of the light head system and the side lighting module through a rotation operation.

According to an embodiment, a circuit board with an OR switch is provided, wherein the magnetic valve control system comprises a control ring and a magnetic valve arranged on the control ring for magnetically coupling with the OR switch, wherein the control ring is capable of being rotated to change a relative position between the magnetic valve and the OR switch for turning on one of the light head system and the side lighting assembly while turning off the other.

According to an embodiment, the magnetic valve control system further comprises a body portion which is connected between the light head system and the light body system, wherein the control ring is sleeved on an outside of the body portion.

According to an embodiment, the magnetic valve control system further comprises an elastic piece and has a sliding groove and two limiting grooves, wherein the magnetic valve and the elastic piece are arranged on an inner surface of the control ring, the sliding groove and the two limiting grooves are provided at the body portion, the magnetic valve is configured to reciprocate along the sliding groove, the elastic piece is configured to be alternately retained at the two limiting grooves when the control ring is rotated to align the elastic piece with one of the two limiting grooves.

According to an embodiment, the sliding groove is divided into a plurality of control areas, and the magnetic valve is suitable for controlling opening and closing of the light head system and the side lighting assembly through magnetic attraction between the magnetic valve at different control areas and the OR switch.

According to an embodiment, when the control ring is rotated clockwise or counterclockwise, the magnetic valve moves along the sliding groove, and the elastic piece is alternately limited by the two limiting grooves, so that the magnetic valve is suitable for magnetically interacting with the OR switch, wherein when the control ring is rotated, the elastic piece is located in one of the two limiting grooves, and the magnetic valve is located in one of the control areas in the sliding groove while the OR switch interacts with the magnetic valve to turn on one of the light head system and the side lighting assembly, wherein when the control ring is rotated again so that when the elastic piece is located in the other limiting groove, the magnetic valve is located in another control area of the sliding groove while the OR switch interacts with the magnetic valve to turn on the other of the light head system and the side lighting assembly, so that the light head system and the side lighting assembly are alternately turned on and off.

According to an embodiment, a control switch is electrically connected to the light head system and the light body system for controlling lighting modes of the light head system and the light body system by a number of pressing times on the control switch.

According to an embodiment, a sealing component connected to the lamp body component is provided, wherein the sealing component has a sliding passage, the sliding passage is communicated with the sliding groove, and the magnetic valve is adapted to enter the sliding groove along the sliding passage.

According to an embodiment, a sealing component connected to the lamp body component is provided, wherein the sealing component comprises a sealing body, at least one sealing ring and multiple sets of sealing threads and has at least one sealing groove, wherein the sealing threads and the sealing groove are annularly arranged on an outer wall of the sealing body, wherein the sealing ring is detachably connected to the corresponding sealing groove, wherein the light head system comprises a protective shell, and multiple circles of limiting threads are provided inside the protective shell for engaging with the sealing threads.

According to an embodiment, the light head system comprises a headlight, the circuit board, a reflective element, a heat dissipation bracket and a transparent cover, wherein the transparent cover is connected to the protective shell, and the headlight is electrically connected to the circuit board, the reflective element and the heat dissipation bracket are installed in the sealing body.

According to an embodiment, a stopper is provided on an outer wall of the transparent cover, and the stopper is located between the transparent cover and the protective shell.

According to an embodiment, an inner wall of the sealing body is provided with at least one mounting groove and one guide rail at intervals, an outer wall of the transparent cover is provided with at least one mounting slide rail which is engaged with the at least one mounting groove, and a side of the circuit board is provided with at least one guide groove which is engaged with the at least one guide rail.

According to an embodiment, the lamp body component comprises a lamp body, a housing connected to the lamp body, a mounting portion and a side light mounting slot for holding the side lighting assembly, wherein the mounting portion is arranged on an upper portion of the lamp body, and the magnetic valve control system is mounted to the lamp body through the mounting portion, the sealing component is connected to a top of the lamp body.

According to an embodiment, the side lighting assembly comprises a side light, a substrate, a heat dissipation plate, a side light reflector and a side light housing, wherein the side light is installed on the substrate which is connected to the heat dissipation plate and the side light reflector, the side light housing is connected to the lamp body, and the side light, the substrate, the heat dissipation plate and the side light reflector are fixed at the side light mounting slot.

According to an embodiment, the light body system further comprises a fixing assembly which is rotatably connected to the lamp body component, wherein the fixing assembly is configured for being fixed to an object through magnetic attraction.

According to an embodiment, a second side lighting assembly is connected to the lamp body component.

According to an embodiment, the magnetic valve control system further comprises an elastic piece and has a sliding groove and three limiting grooves, wherein the magnetic valve and the elastic piece are arranged on an inner surface of the control ring, the sliding groove and the three limiting grooves are provided at the body portion, the magnetic valve is configured to reciprocate along the sliding groove, the elastic piece is configured to be alternately retained at the three limiting grooves when the control ring is rotated to align the elastic piece with one of the three limiting grooves.

According to an embodiment, the sliding groove has a headlight control area and a side light control area, wherein when the magnetic valve is located in the headlight control area of the sliding groove, the elastic piece is located in one limiting groove, wherein the magnetic valve is at a distance far away from the OR switch to activate the light head system; when the control ring is further rotated, the elastic piece enters into the other limiting groove, and the magnetic valve slides along the sliding groove to enter the side light control area of the sliding groove, wherein the magnetic valve is close to the OR switch to allow the magnetic valve to attract the OR switch and turn on the side lighting assembly.

According to an embodiment, the body portion of the magnetic valve control system has one thick end portion and one thin end portion, and a protrusion is provided at a junction of the thick end portion and the thin end portion, wherein the control ring is sleeved on the body portion above the protrusion.

According to one aspect of the invention, a multi-sided work light is provided, comprising:
  a light head system;
  a light body system, the light body system comprises a sealing component, at least one side lighting assembly, a lamp body component and a power supply component, the light head system, the sealing component and the side light emitting component are all connected to the lamp body component, the power supply component is electrically connected to the side lighting assembly and the light head system to provide power to the light head system and the side lighting assembly; and
  a magnetic valve control system, the magnetic valve control system is connected to the sealing component to protect components of the light head system, wherein the magnetic valve control system controls the light head system and the side lighting module through rotation.

According to another aspect of the present invention, the present invention also provides a magnetic valve control system for a multi-sided work light, which is suitable for being installed on a work light and switches different lights of the work light through rotation and magnetism, wherein the magnetic valve control system comprises:
  a body portion provided with a protrusion;
  a control ring rotatably sleeved on an outside of the body portion and limited by the protrusion;
  a magnetic valve arranged on an inner surface of the control ring; and
  an elastic piece provided on the inner surface of the control ring, wherein the control ring is rotated to drive the movement of the magnetic valve and the elastic piece to control the multi-sided work light.

According to an embodiment, the magnetic valve control system of the multi-sided work light further comprises at least two limiting grooves, the limiting grooves are provided on the body portion, and the elastic piece is suitable for switching between the limiting grooves.

According to an embodiment, the magnetic valve control system of the multi-sided work light further has a sliding groove, the sliding groove is provided on the body portion, the size of the sliding groove is larger than the size of the magnetic valve, and the magnetic valve is adapted to reciprocate along the sliding groove, wherein the elastic piece is driven to alternately engage with different limiting grooves. When the elastic piece is located in one limiting groove, the magnetic valve is fixed at a certain position of the sliding groove to control the headlight or the side light.

According to an embodiment, the sliding groove is divided into a headlight control area and a side light control area, and the magnetic valve is adapted to magnetically attract an OR switch included in the multi-sided work light.

According to another aspect of the present invention, the present invention also provides a control method for a multi-sided work light, which comprises the following steps:

(S101) Activate a control switch;
(S102) Rotate a control ring provided on the multi-sided work light;
(S103) Drive a magnetic valve to move along a sliding groove, wherein an elastic piece is suitable for switching connection between at least two limiting grooves;
(S104) Allow the magnetic valve to interact with an OR switch in different control areas of the sliding groove;
(S105) Control the opening and closing of the lights through the magnetic attraction of the magnetic valve to the OR switch; and
(S106) Drive the magnetic valve to reciprocate in different control areas of the sliding groove to control the opening and closing of different lights.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
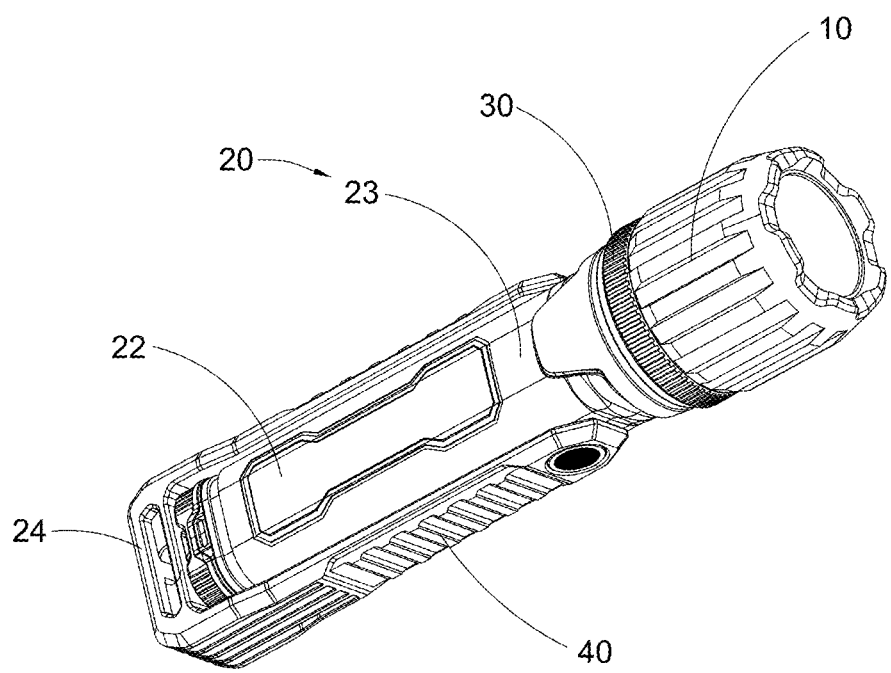
FIG. 1 is a perspective view illustrating an overall structure of a multi-sided work light according to a preferred embodiment of the present invention.
Figure 2:
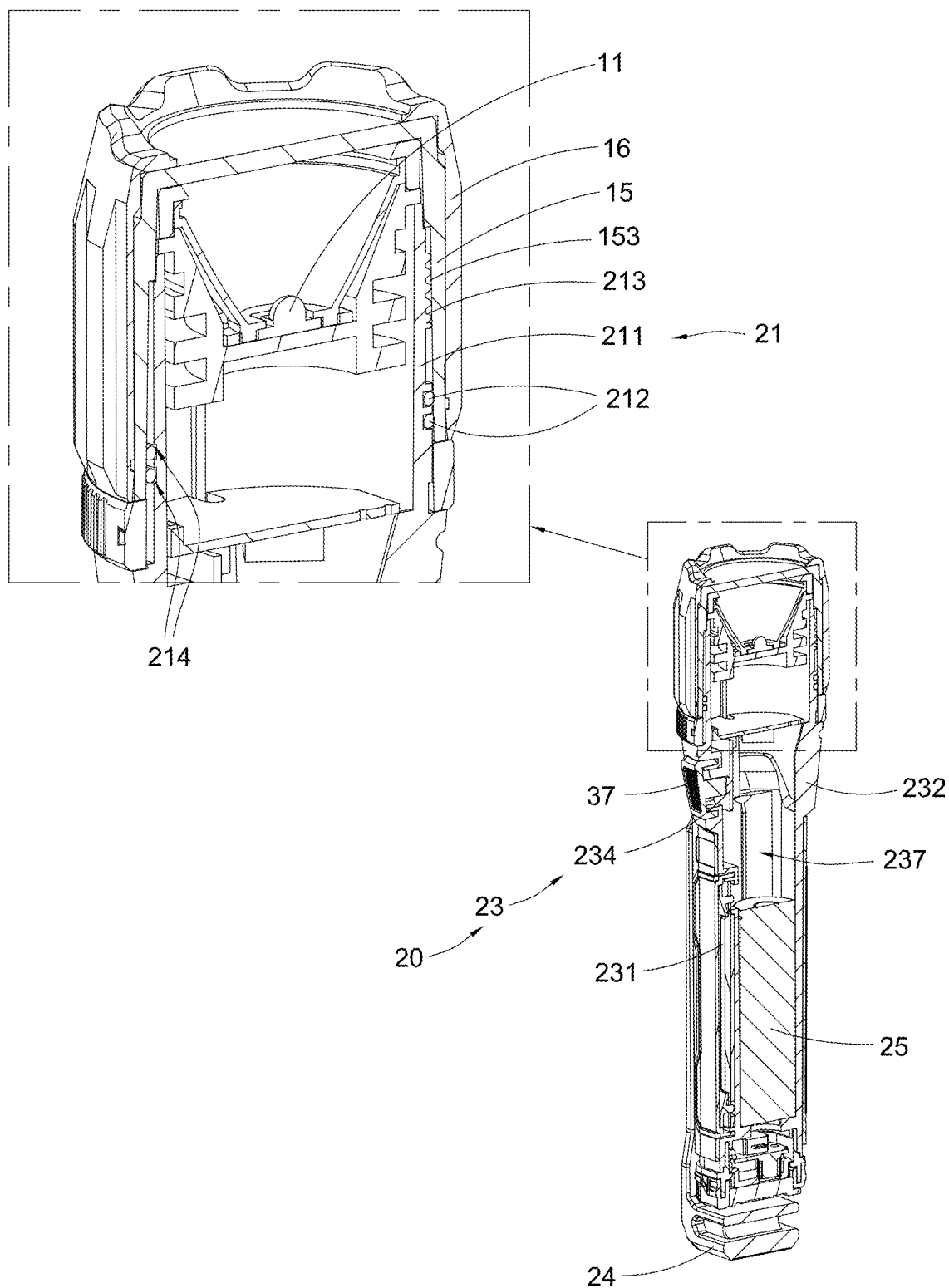
FIG. 2 is a sectional view of the multi-sided work light according to the above mentioned preferred embodiment of the present invention.
Figure 3:
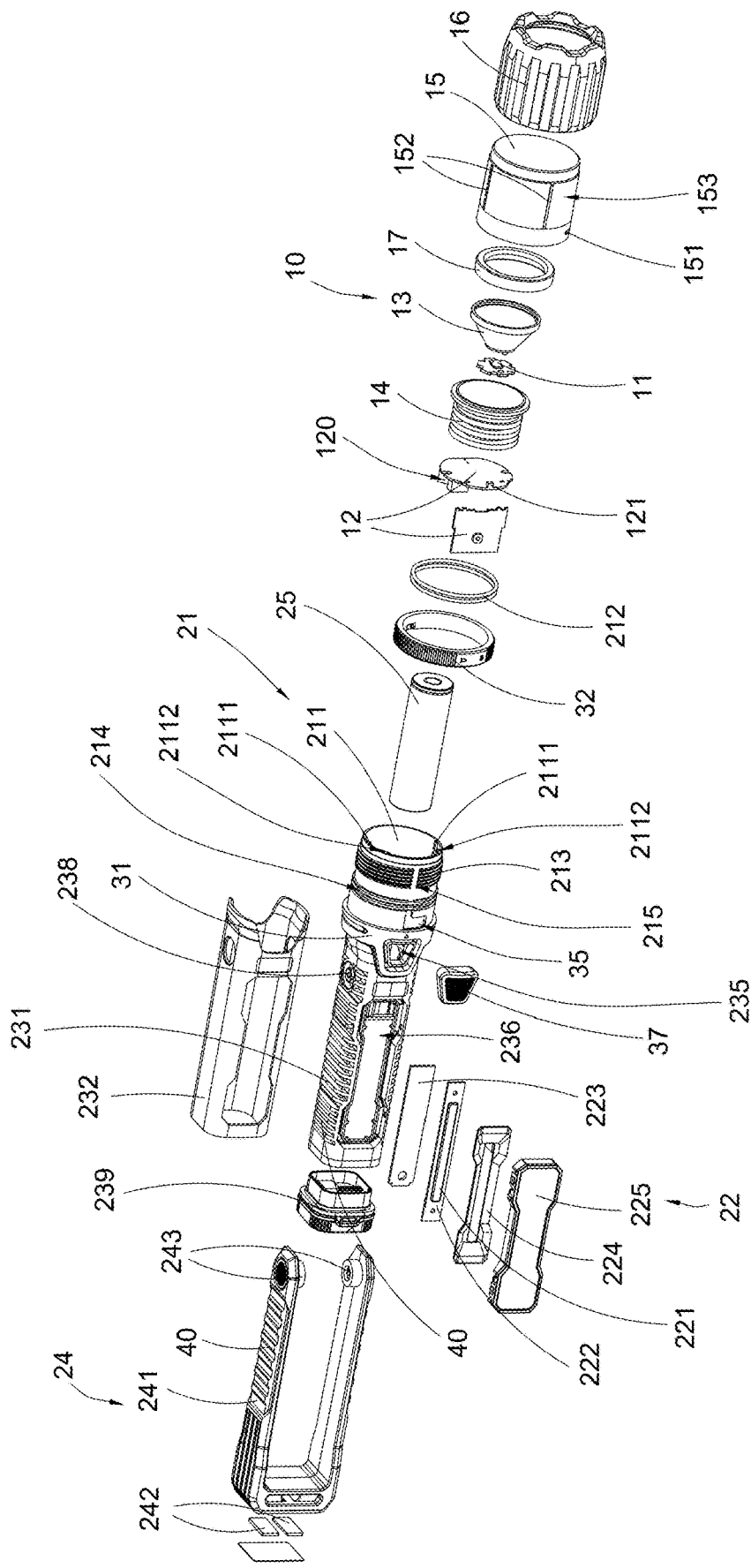
FIG. 3 is an exploded view of the multi-sided work light according to the above mentioned preferred embodiment of the present invention.
Figure 4:
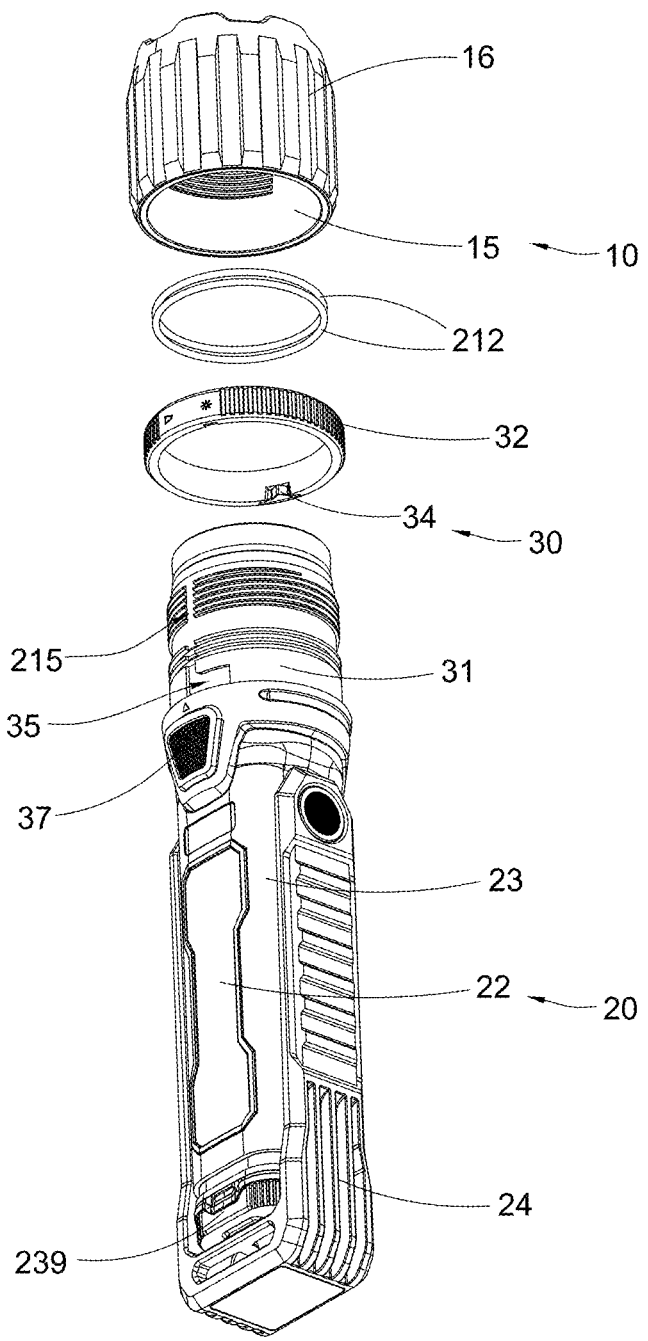
FIG. 4 and FIG. 5 are respectively partially exploded views of the multi-sided work light according to the above mentioned preferred embodiment of the present invention.
Figure 5:
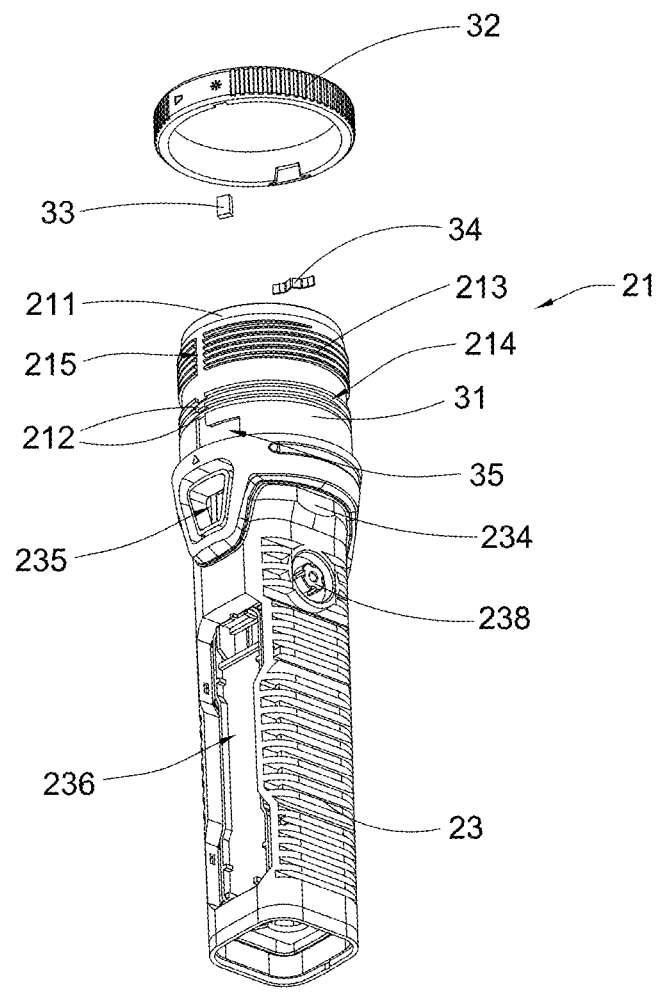

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above mentioned terminologies shall not be interpreted as confine to the present invention.

Referring to FIG. 1 to FIG. 9, a multi-sided work light according to a preferred embodiment of the present invention is schematically illustrated. In this embodiment, the multi-sided work light comprises a light head system 10, a light body system 20 and a magnetic valve control system 30. The light head system 10 is connected to the light body system 20 through the magnetic valve control system 30. The magnetic valve control system 30 is connected to the light head system 10 and the light body system 20 to control the switching between different lights of the light head system 10, and the switching between different lighting modes can also be controlled, making the multi-sided work light easier to operate, and can also enhance the waterproof property of the multi-sided work light while also allowing the multi-sided work light to be smaller in size.

The light head system 10 comprises a headlight 11, a circuit board 12, a reflective element 13, a heat dissipation bracket 14, a transparent cover 15, a protective shell 16 and a shock absorbing element 17, wherein the reflective element 13 is tapered, the headlight 11 is installed on the bottom of the tapered reflective element 13.

The headlight 11 and the reflective element 13 are further installed inside the heat dissipation bracket 14, and a lower portion of the heat dissipation bracket 14 is connected to the light body system 20, the transparent cover 15 is sleeved inside the protective shell 16, and then further connected to the light body system 20, and then the heat dissipation bracket 14 and the headlight 11 are installed inside, so that the light source emitted by the headlight 11 can pass through the transparent cover 15 and projects outward, and the shock absorbing element 17 can be a shock absorbing pad installed between the heat dissipation bracket 14 and the transparent cover 15. When the various components of the light head system 10 are tightly installed, the shock-proof performance can also be increased, so that the multi-sided work light is more resistant to falling, which helps to increase its service life.

The headlight 11 is further electrically connected to the circuit board 12, and the circuit board 12 is installed inside the light body system 20. The circuit board 12 comprises two vertically connected COB boards installed to the inside of the light body system 20, one is installed horizontally and the other is installed vertically, so as to occupy less space, which is beneficial to reducing the size of the work light and making it easier to carry and transport.

A stopper 151 is provided on an outer wall of the transparent cover 15, so that after the transparent cover 15 is installed inside the protective shell 16, the stopper 151 can be close to the bottom of the protective shell 16 to prevent backing up, so that the connection between the transparent cover 15 and the protective shell 16 is tighter, and can prevent the protective shell 16 from moving downward too much and squeezing the magnetic valve control system 30, thus avoiding the extrusion of the protective shell 16. The pressure causes the magnetic valve control system 30 to be unable to rotate.

The light body system 20 comprises a sealing component 21, a side lighting assembly 22, a lamp body component 23, a fixing assembly 24 and a power supply component 25. The sealing component 21 is disposed on the lamp body component 23. The top is connected to the magnetic valve control system 30 and the light head system 10 to increase sealing and prevent water intrusion. The side lighting assembly 22 is arranged on a side of the lamp body assembly 23 to emit light from the side, and cooperates with the light head system 10 which emits light from the front side, so as to form a multi-sided work light. The power supply component 25 is arranged inside the lamp body component 23, and is electrically connected to the side lighting assembly 22 and the circuit board 12 of the light head system 10 to provide power to the side lighting assembly 22 and the headlight 11. The fixing assembly 24 is rotatably disposed in the middle of the lamp body component 23 to fix the multi-sided work light on other objects in a convertible manner at various angles to meet various user needs.

The sealing component 21 comprises a sealing body 211, two sealing rings 212 and multiple sets of sealing threads 213, two sealing grooves 214, and a sliding passage 215, wherein the two sealing grooves 214 are adjacent and arranged in an annular shape on a lower portion of the outer wall of the sealing body 211, the sealing threads 213 are annularly provided on an upper portion of the outer wall of the sealing body 211. The two sealing rings 212 are detachably disposed in the two sealing grooves 214 respectively. The sliding passage 215 is longitudinally disposed on the sealing body 211 divide each of the sealing threads 213 and the two sealing grooves 214 into two parts, so as to form a sliding channel from the top to the bottom of the sealing body 211, which facilitates the installation of the magnetic valve control system 30 and saves assembly time.

The sealing threads 213 are matched with the multiple limiting threads 153 provided on the inner wall of the transparent cover 15. When the light head system 10 is connected to the light body system 20, the transparent cover 15 and the protective shell 16 are connected through the matching limiting threads 153 and the sealing threads 213.

The protective shell 16 and the transparent cover 15 are sleeved on the outside of the sealing body 211, and the transparent cover 15 and the sealing body 211 are connected through the sealing threads 213 and the sealing rings 212 which are tightly connected and there is no gap between them, thus achieving the purpose of waterproofing.

When the protective shell 16 and the transparent cover 15 are connected to the sealing body 211, the headlight 11, the circuit board 12, the reflective element 13 and the heat dissipation bracket 14 enter the cavity of the sealing body 211, so as to be protected by the sealing body 211.

A guide rail 2111 is provided on each of two corresponding sides of the inner wall of the sealing body 211 to match with each of two guide grooves 120 provided on two sides of the circuit board 12, so that when the circuit board 12 is internally installed on the sealing body 211, more precise positioning is performed to ensure rapid assembly. The circuit board 12 can be installed in place more quickly, and then further firmly fixed with nails, and thus be fixed in a variety of ways, so that the circuit will not be blocked due to shaking or falling during use, adding to the durability of the multi-sided work light.

In addition, the inner wall of the sealing body 211 is also provided with two mounting grooves 2112. The two guide rails 2111 and the two mounting groove 2112 are spaced apart and provided on the inner wall of the sealing body 211, and the transparent cover 15 is provided with two mounting slide rails 152 which are longitudinally provided on the outer wall of the cover 15. The mounting slide rails 152 are matched with the mounting grooves 2112 to facilitate accurate positioning during installation. During the manufacturing process, by arranging the mounting slide rails 152 to correspond to the mounting grooves 2112 and arranging the guide rails 2111 to correspond to the guide grooves 120, the circuit board 12 can be slidably mounted in the cavity of the sealing body 211. This sliding installation method that matches the rails and grooves facilitates positioning and is more secure after installation. It also makes assembly simpler and helps improve production efficiency.

The lamp body component 23 comprises a lamp body 231 and a housing 232. The housing 232 is sleeved on the outside of the lamp body 231 to protect the lamp body 231 and is installed on the lamp body 231 to protect other components, one end of the lamp body 231 is connected to the sealing body 211 of the sealing component 21, wherein the lamp body 231 and the sealing body 211 can be integrally connected.

It is worth mentioning that the size of the housing 232 is larger than the size of the sealing body 211 and the lamp body 231, so that the lamp body 231 is disposed inside the housing 232, and after the magnetic valve control system 30 is installed on the outside of the sealing body 211 and the lamp body 231, the size of the housing 232 matches with the size of the magnetic valve control system 30, so that the aesthetic appearance of the multi-sided work light is enhanced.

The lamp body component 23 comprises a mounting portion 234 which is disposed on an upper part of the lamp body 231 to install the magnetic valve control system 30. In this embodiment, due to the size of the housing 232 is larger than the size of the lamp body 231, so that after the mounting portion 234 is sleeved on the outside of the lamp body 231, a groove is formed with respect to the housing 232, so as to match with the magnetic valve control system 30, so that the magnetic valve control system 30 is sleeved on the outside of the lamp body 231, and after installation, the magnetic valve control system 30 is located between the light head system 10 and the light body system 20 and flush with the lower portion of the lamp body 231 and the protective shell 16, so that it conforms to ergonomic design, has a more beautiful appearance, and is more comfortable for the user to hold.

The lamp body component 23 has a switch mounting slot 235 which is provided on the lamp body 231 to facilitate the installation of a control switch 37 of the magnetic valve control system 30. When the control switch 37 is installed in the switch mounting slot 235, the gap between the control switch 37 and the lamp body 231 needs to be sealed with glue to ensure better waterproofing.

The lamp body component 23 also has a side light mounting slot 236 which is provided on the side lamp body 231 and is located below the switch mounting slot 235 to facilitate the installation of the side lighting assembly 22.

The lamp body component 23 also has a receiving cavity 237 which is provided inside the lamp body 231 to accommodate the power supply component 25, wherein the headlight 11, the circuit board 12, the reflective element 13 and the heat dissipation bracket 14 are connected to the upper part of the power supply component 25.

The side lighting assembly 22 comprises a side light 221, a substrate 222, a heat dissipation plate 223, a side light reflector 224 and a side light housing 225. The side light 221 is installed on the substrate 222. The substrate 222 is further electrically connected to the circuit board 12, wherein the substrate 222 can be implemented as a COB board, and the heat dissipation plate 223 is disposed on the substrate 222, the side light reflector 224 is further installed on the substrate 222 and the heat dissipation plate 223. The side light 221 is exposed from the hole at the bottom of the side light reflector 224 to illuminate the outside, the side wall of the side light reflector 224 can reflect light, so that the side light 221 has a larger illumination angle and illumination area. Moreover, after the substrate 222, the heat dissipation plate 223 and the side light reflector 224 are installed, a glue can be further bonded to seal the substrate 222, the heat dissipation plate 223 and the side light reflector 224. and the lamp body 231 to achieve the purpose of waterproofing.

The side light housing 225 is installed on the outside of the side light reflector 224, wherein the side light housing 225 is a transparent shade, and the sides of the side light housing 225 are connected to the lamp body 231 at the sides of the side light mounting groove 236.

It is worth mentioning that the side light housing 225 comprises a side light shade body and two buckles and two elastic buckles provided on the side light shade body. The buckles and the elastic buckles are arranged on the side light shade to engage with the grooves of the lamp body 231, so as to facilitate the installation of the side lamp cover 225.

The lamp body component 23 also has two rotating parts 238. The rotating parts 238 are provided on the lamp body 231 and match with the rotating holes provided on two sides of the housing 232, so as to rotatably connect the two rotating parts 238 and allow the fixing assembly 24 to enable the multi-sided work light to be fixed at various angles to meet various needs of users.

The lamp body component 23 also comprises a battery level display unit 239. The battery level display unit 239 is connected to the power supply component 25 and the circuit board 12, wherein the battery level display unit 239 is disposed at a bottom of the lamp body 231, and is wrapped by the housing 232, the battery level of the power supply component 25 can be displayed from a side of the lamp body 231 by configuring the side of the lamp body 231 in a partially transparent manner. The battery level can be displayed in different colors, such as red, green and yellow, or can be displayed in the form of a specific digital display. The battery status allows the user to know the current battery level of the work light.

The fixing assembly 24 comprises a fixing body 241, at least one magnetic element 242 and two fixing gears 243. The magnetic element 242 can be implemented as one or multiple. In this embodiment, two magnetic elements 242 are provided adjacent to one end of the fixing body 241, the fixing body 241 has a U-shaped structure, and the two fixing gears 243 are respectively provided on the upper parts of the two U-shaped brackets at both ends of the fixing body 241, so that the U-shaped fixing body 241 is formed from the bottom of the lamp body 231 and extended upward to be sleeved inside the fixing body 241, so that the fixing body 241 is located outside the housing 232 and forms an integral body with the lamp body 231 and the housing 232, so as to narrow down the size of the multi-sided work light, and when it is necessary to rotate to a certain angle for use, the angle between the lamp body 231 and the fixing body 241 can be changed by rotating the lamp body 231 or the fixing body 241, thereby changing the illumination area and illumination angle.

The fixing gear 243 is matched with the rotating part 238. After passing through the rotating hole at the top of the housing 232, The fixing gear 243 is further rotatably connected to the rotating part 238, so that the fixing body 241 is connected to the lamp body 231 and the housing 232, which also makes the connection between the housing 232 and the lamp body 231 more stable.

Figure 8:
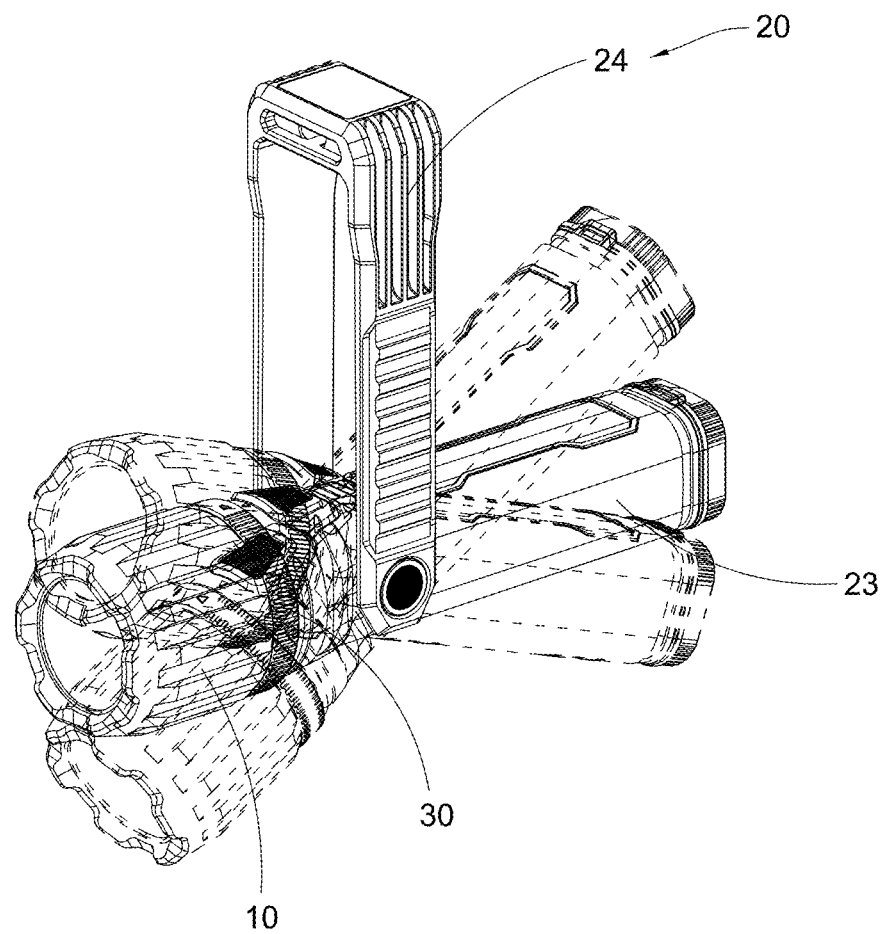
FIG. 8 This is a schematic view illustrating the multi-sided work light at different fixed angles according to the above mentioned preferred embodiment of the present invention.
Figure 9:
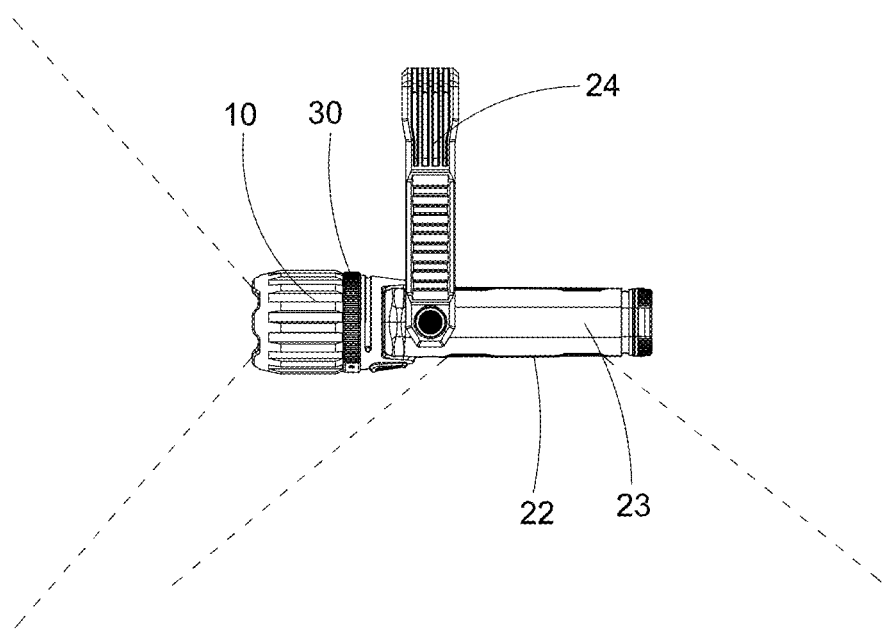
FIG. 9 is a schematic view illustrating the light emitting operation of the multi-sided work light according to the above mentioned preferred embodiment of the present invention.

Referring to FIGS. 8 and 9, under the cooperation of the fixing gear 243 and the rotating part 238, by applying an external force, the fixing gear 243 can rotate around the rotating part 238, and under the rotation of the fixing gear 243, the angle between the fixing body 241 and the lamp body 231 can be changed, and the fixing body 241 can be rotated to any angle and fixed. That is to say, the fixing body 241 can maintain any fixed angle with the lamp body 231, and the fixed angle can be changed by rotating, and then the magnetic element 242 is adsorbed on an object, and the headlight 11 and the side light 221 can illuminate multiple directions, and the user does not need to hold the work light by hand, so that it is easy to use and simple to operate. When fixed, the illumination area can be changed by simply adjusting the angle between the two. It is very practical for many occasions, especially when the user needs to work with both hands. The multi-sided features of the present invention, and the fixing method and angle adjustment of the work light can meet the user's needs.

The angles between the multiple gear members of the fixing gear 243 can be made according to needs. Each operation rotates one gear member and can be fixed at the gear member. Therefore, different numbers of gear members can change different fixing angles, and during the production process, gear members with different spacings can be selected according to the usage occasion.

It is worth mentioning that the multi-sided work light of the present invention has very good waterproof performance. Through sealing in multiple positions and in various ways, its sealing performance is improved in terms of technology and structure, and it is especially suitable for environments with water, such as use in rainy days or diving, etc.

The power supply component 25 is disposed in the receiving cavity 237 inside the lamp body 231, wherein the power supply component 25 is electrically connected to the circuit board 12 and the substrate 222 to provide power to the headlight 11 and the side lights 221. The power supply component 25 can be implemented as a storage battery, a dry cell, or a directly charged unit.

The magnetic valve control system 30 comprises a body portion 31 and a control ring 32. The body portion 31 is connected between the sealing body 211 and the lamp body 231, and located outside the mounting portion 234 of the lamp body 231 and the sealing body 211. The size of the lower part of the body portion 31 is larger than the size of the upper part, so that the body portion 31 is matched with the size of the housing 232 after being installed, and is more beautiful. At the same time, the size of the upper part is smaller and is sleeved on the outside of the sealing body 211, the upper part of the body portion 31 is flush with the sealing thread 213 and the walls on two sides of the sealing groove 214. The control ring 32 is suitable for being sleeved on the outside of the upper half of the body portion 31. After the sleeve installation, the control ring 32 is flush with the lower half of the body portion 31.

That is to say, the body portion 31 has one thick end portion and one thin end portion, and a protrusion 310 is provided at the junction of the thick end portion and the thin end portion. The protrusion 310 makes the body portion 31 appear thin at the top and thick at the bottom. And the size of the protrusion 310 is matched with the size of the control ring 32. When the control ring 32 is sleeved on the upper part of the body portion 31, the protrusion 310 can lift the control ring 32 from the bottom and play a limiting role on the control ring 32, so that the control ring 32 can only move between the protrusion 310 of the body portion 31 and the protective shell 16, and can only move axially and cannot move radially, so as to improve the overall stability of the work light This means that the control ring 32 is limited between the protective shell 16 and the body portion 31, and rotates around the sealing body 211 to control the headlight 11 and the side lights 221 through rotation.

It is worth mentioning that the body portion 31, the sealing body 211 and the lamp body 231 are suitable for one-piece manufacturing, and can also be separate components which are assembled and connected to each other. In this embodiment, in order to increase waterproofing performance, the one-piece manufacturing method is adopted.

The magnetic valve control system 30 also comprises a magnetic valve 33 and an elastic piece 34. The magnetic valve 33 and the elastic piece 34 are both disposed on the inner wall of the control ring 32, and the magnetic valve 33 and the elastic piece 34 are arranged correspondingly. During the installation process, the magnetic valve 33 on the inner wall of the control ring 32 moves along the sliding passage 215 from the top of the sealing body 211 toward the bottom of the sealing body 211, so that the control ring 32 passes through the sealing body 211 and is sleeved on the outside of the upper portion of the body portion 31. Through the design of the sliding passage 215, it not only ensures accurate and rapid installation, but also ensures sealing, making the multi-sided work light have excellent waterproof performance.

The circuit board 12 comprises an OR switch 121. The OR switch 121 is disposed on the edge of the circuit board 12. The magnetic valve 33 and the OR switch 121 are connected correspondingly, a magnetic attraction can be generated between the magnetic valve 33 and the OR switch 121, and different lights can be activated through the interaction between the magnetic valve 33 and the OR switch 121.

Figure 6A:
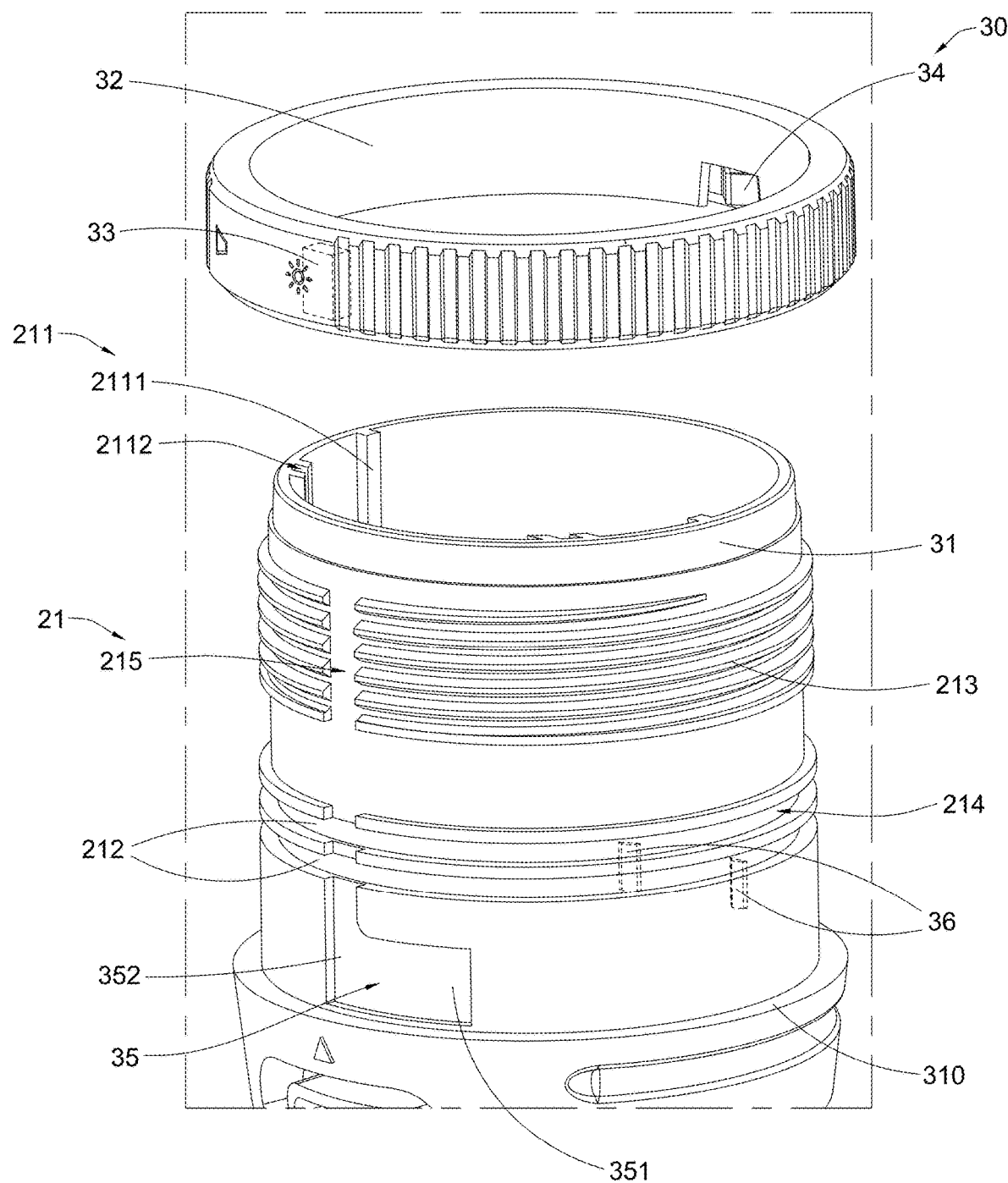
FIG. 6A, FIG. 6B and FIG. 6C are respectively schematic views illustrating the assembly and working process of the magnetic valve control system of the multi-sided work light according to the above mentioned preferred embodiment of the present invention.
Figure 6B:
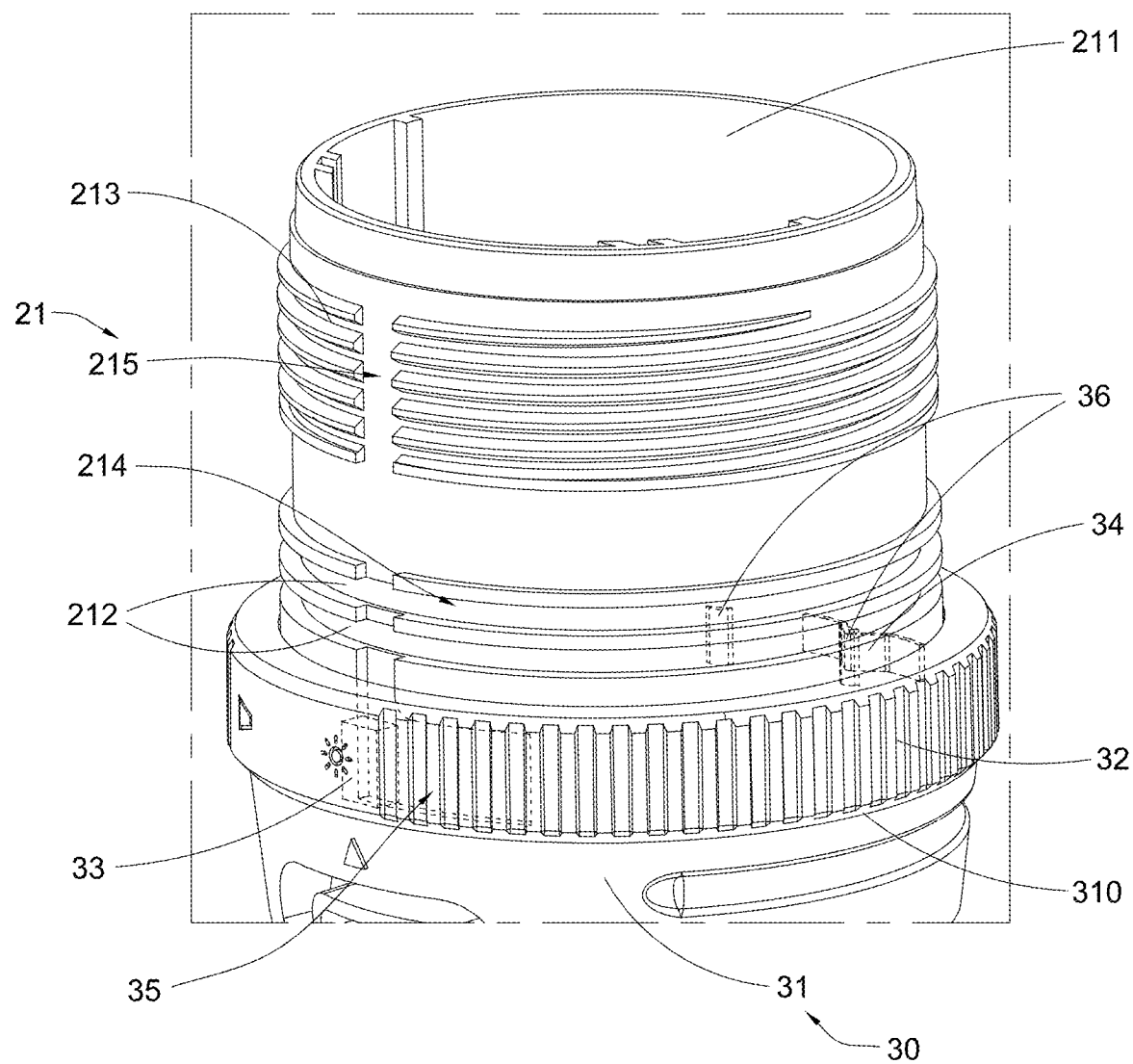
Figure 6C:
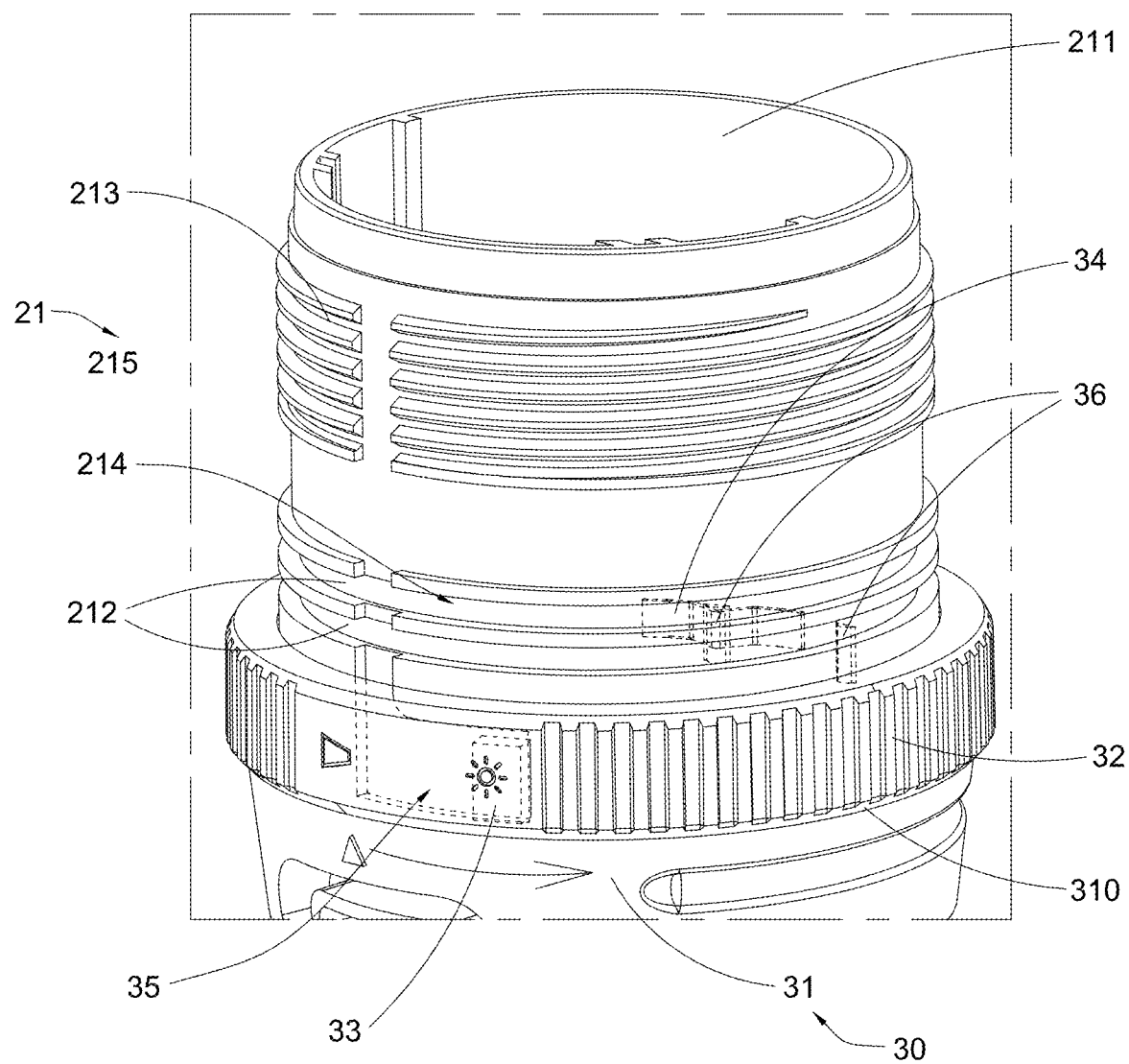
Figure 7:
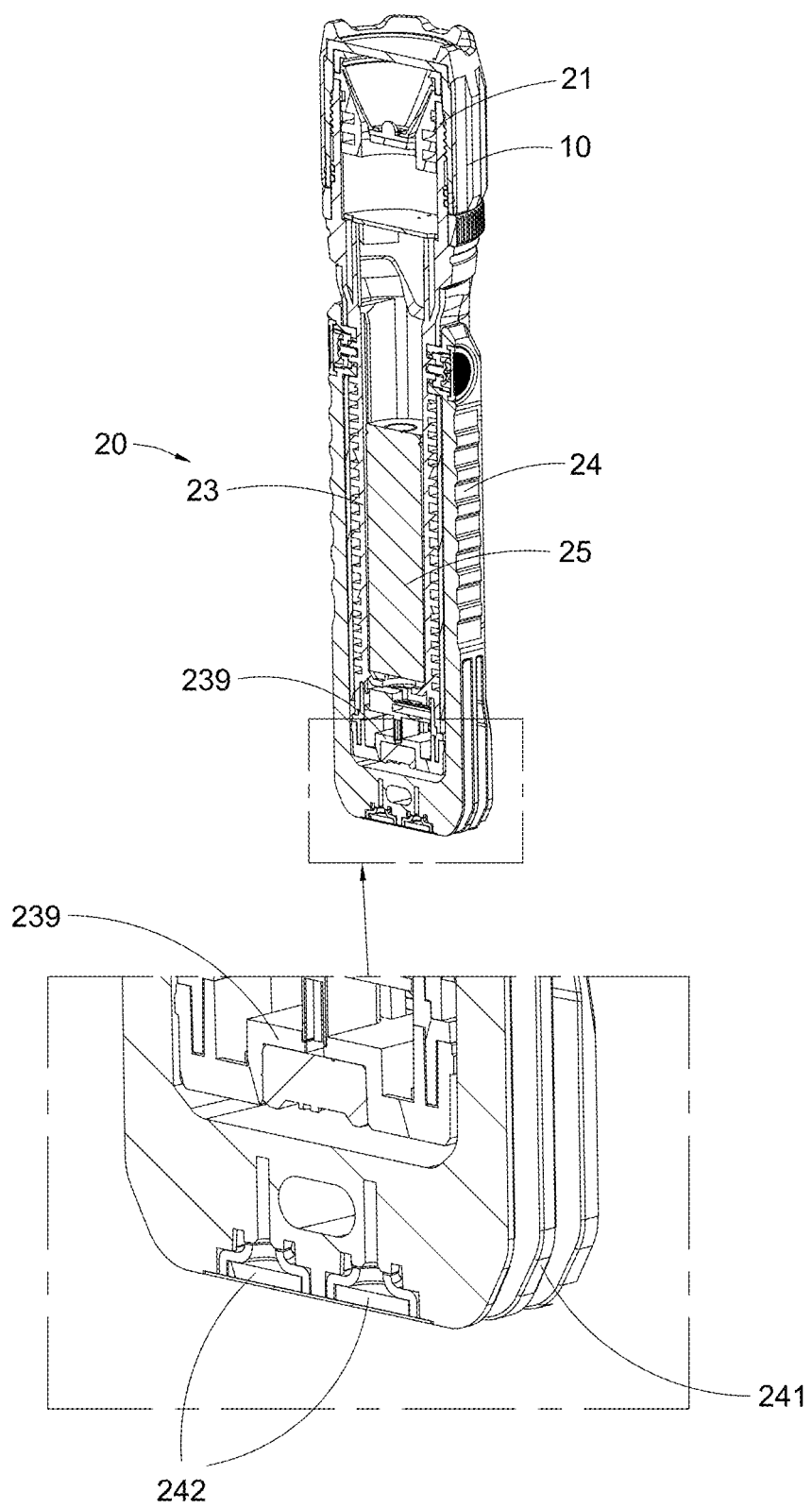
FIG. 7 is another sectional view from another perspective view angle of the multi-sided work light according to the above mentioned preferred embodiment of the present invention.

The magnetic valve control system 30 has a sliding groove 35 and two limiting grooves 36. The sliding groove 35 and the limiting grooves 36 are both provided at the outer wall of the body portion 31, and two limiting grooves 36 are arranged adjacently, and each limiting groove 36 is in the form of an indented groove which is corresponding to the elastic piece 34. When the control ring 32 is rotated, the elastic piece 34 is extruded into different limiting grooves 36 respectively. At this time, the magnetic valve 33 is also located at different positions of the sliding groove 35, and then cooperate with the OR switch 121 to produce different functions to selectively activate different lights. Referring to FIGS. 6A to 6C, the positions of the two limiting grooves 36 are respectively on the same straight line as the positions of two ends of the sliding groove 35. The sliding groove 35 is divided into a headlight control area 351 and a side light control area 352. When the magnetic valve 33 is located in the headlight control area 351 of the sliding groove 35, the elastic piece 34 is located in one limiting groove 36 to play a limiting role to control the magnetic valve 33 in the headlight control area 351 of the sliding groove 35, at this time, the magnetic valve 33 is at a distance far away from the OR switch 121 to activate the headlight 11 of the light head system 10; when the control ring 32 is rotated, the elastic piece 34 enters into the other limiting groove 36, and the magnetic valve 33 slides along the sliding groove 35 to enter the side light control area 352 of the sliding groove 35. At this time, the magnetic valve 33 is close to the OR switch 121, and the magnetic valve 33 can attract the OR switch 121 and turn on the side light 221. That is to say, the opening and closing of the headlight 11 and the side light 221 are controlled through the cooperation between the magnetic valve 33 and the OR switch 121, as well as the engagement between the limiting grooves 36 and the elastic piece 34.

It is worth mentioning that the magnetic valve 33 and the OR switch 121 can function within an effective space. In other words, the magnetic valve 33 affecting the OR switch 121 does not need to be limited to a fixed position. For example, in theory, when the magnetic valve 33 moves to the minimum distance from the OR switch 121, the magnetic attraction between the two is maximum, and the magnetic valve 33 and the OR switch 121 are activated to conduct the circuit for emitting light. However, when the magnetic valve 33 approaches the OR switch 121 from a relatively long distance, the OR switch 121 can enter the influence area of the magnetic valve 33 and be influenced to be activated.

Therefore, when the multi-sided work light needs to be switched between different lighting states, for example, the magnetic valve 33 enters the headlight control area 351 from the side light control area 352 of the sliding groove 35, although the entire sliding groove 35 has a certain circumferential length, and the magnetic valve 33 needs to move a certain distance along the sliding groove 35. However, this does not cause the instantaneous disconnection of the switch 121 during this process to cause the multi-sided to stop working. The OR switch 121 is continuously affected by the magnetic valve 33 located in the side light control area 352 or the magnetic valve 33 moved to the headlight control area 353 or is affected by both and can keep the work uninterrupted, after the influence of the headlight control area 353 is greater than that of the side light control area 352, the OR switch 121 switches the working state instantly, so that the lighting state of the entire multi-sided work light changes.

The magnetic valve control system 30 also comprises the control switch 37. The control switch 37 passes through the hole provided at the lower part of the control body 231 and then enters the switch mounting slot 235, and is then arranged on the lamp body 231, and is connected to the circuit board 12 to activate or deactivate the multi-sided work light, and control the lighting modes of the side light 221 and the headlight 11. The control switch 37 can be made of silicone which is more convenient to press.

The headlight 11 and the side light 221 have three lighting modes: strong, medium and weak. Press the control switch 37 once to activate the strong light mode, press the control switch 37 twice to activate the medium light mode, and press the control switch 37 three times to activate the medium light mode. The control switch 37 is in the low light mode, and the lighting mode is changed by pressing the control switch 37 a number of times. The headlight 11 or the sidelight 221 is started by rotating the control ring 32, and then the lighting mode is changed by the control switch 37.

Those skilled in the art can understand that the headlight 11 and the side light 221 can also be set to other lighting modes, such as flashing mode, warning mode displaying lights of different colors, long lighting mode, white light mode, warm light mode etc.

In this embodiment, the sliding groove 35 is arranged in the form of an indented groove, and the sliding groove 35 is communicated with the sliding passage 215. When the magnetic valve 33 provided on the inner wall of the control ring 32 moves along the sliding passage 215 provided at the outer wall of the sealing body 211 until the magnetic valve 33 slides downward to the area of the body portion 31, the magnetic valve 33 directly enters the sliding groove 35, and the width size of the sliding groove 35 is larger than the width size of the magnetic valve 33, so that the magnetic valve 33 can move laterally inside the sliding groove 35, that is, when the user rotates the control ring 32, the magnetic valve 33 can perform lateral reciprocating movement inside the sliding groove 35, then the control ring 32 can rotate clockwise or counterclockwise along the body portion 31, the rotation angle of the control ring 32 depends on the sliding distance of the magnetic valve 33 along the sliding groove 35, which can also be said to depend on the relative size difference between the magnetic valve 33 and the sliding groove 35.

In this embodiment, the length of the sliding groove 35 is 5-15 mm, preferably 7 mm, which not only ensures that the OR switch 121 can be connected at different positions to activate different lights, but also allows the magnetic valve 33 to slide a less distance, which facilitates a single hand operation, makes sliding switching faster and smoother, increases convenience, and also enables the magnetic valve control system 30 to be applied in smaller work lights.

In addition, the two limiting grooves 36 are respectively matched with the elastic piece 34. When the control ring 32 rotates, the elastic piece 34 alternately changes positions between the two limiting grooves 36. When the control ring 32 rotates, the elastic pieces 34 alternately change positions. When the elastic piece 34 is located in one of the two limiting grooves 36, one of the side light 221 and the headlight 11 is activated, when the elastic piece 34 is rotated to the other limiting groove 36, the other of the side light 221 and the headlight 11 is activated.

It is worth mentioning that the outer wall of the control ring 32 is provided with anti-slip threads to facilitate operation and rotation.

The solenoid valve control system 30 may further comprise a display, which is adapted to be disposed outside the control ring 32 to display whether the headlight or the side light is currently activated, that is to say, the display is connected to the magnetic valve 33. When the magnetic valve 33 interacts with the OR switch 121 at different positions, one of the headlight 11 or the side light 221 is activated, and the display can adopt icons as an intuitive way to remind users of the currently working light. Those skilled in the art can understand that the display is provided only as an example, and the display part may not be provided or the display may be provided at other positions of the work light.

The multi-sided work light also comprises an anti-slip component 40, which is disposed on the outer wall of the lamp body 231 and the fixing body 241 to play an anti-slip role during use.

The control method (S100) for the magnetic valve control system 30 to control the multi-sided work light comprises the following steps:
(S101) Activating the control switch 37;
(S102) Rotating the control ring 32 provided on the multi-sided work light;
(S103) Driving the magnetic valve 33 to move along the sliding groove 35, wherein the elastic piece 34 is suitable for switching connection between at least two limiting grooves 36;
(S104) Allowing the magnetic valve 33 to interact with the OR switch 121 in different control areas of the sliding groove 35;
(S105) Controlling the opening and closing of the lights through the magnetic attraction of the magnetic valve 33 to the OR switch 121; and
(S106) Driving the magnetic valve 33 to reciprocate in different control areas of the sliding groove 35 to control the opening and closing of different lights.

In the above steps, the control ring 32 is rotated clockwise, the magnetic valve 33 moves along the sliding groove 35 to the headlight control area 351, and is connected to the circuit board 12, and the elastic piece 34 is rotated to one limiting groove 36, and the headlight 11 is turned on. start; then continue to rotate the control ring 32 clockwise, the magnetic valve 33 moves along the sliding groove 35 to the side light control area 352, and the elastic piece 34 is rotated to the other limiting groove 36, the side light 221 is turned on, and the headlight 11 is turned off.

In the above steps, the lighting modes of the headlight 11 and the side light 221 are changed by changing the number of times the control switch 37 is pressed.

Figure 10:
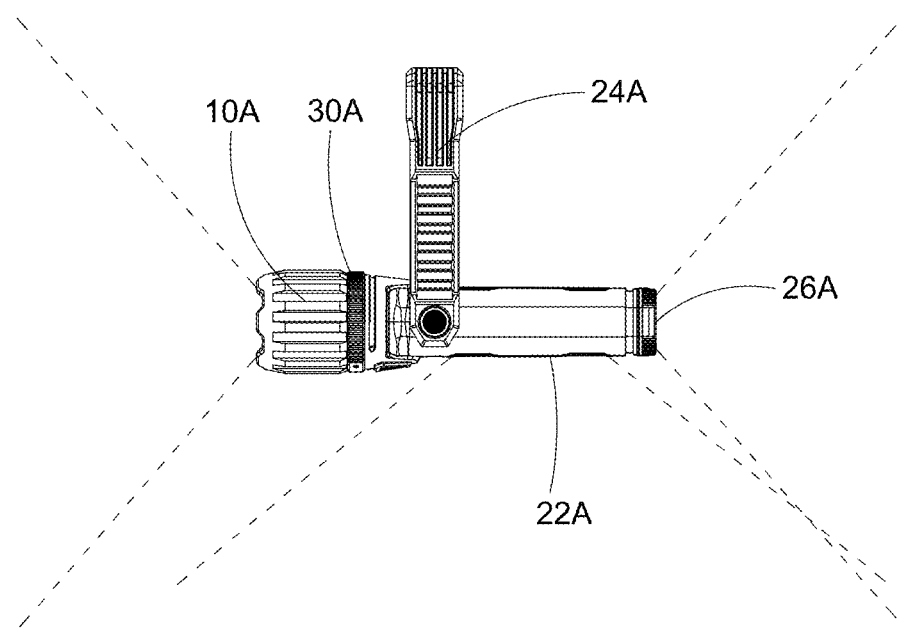
FIG. 10 is a schematic view of a multi-sided work light according to another preferred embodiment of the present invention.

FIG. 10 is a schematic view of an alternative mode of the present invention. In this embodiment, three lights are provided, that is, a bottom light assembly 26A is added to the bottom of the lamp body. The bottom light assembly 26A, the light head system 10A, the side lighting assembly 22A are respectively provided on the work light at the bottom, top and side of the work light that emits light from three sides. After the fixing assembly 24A is fixed at a larger angle with the work light body, it can form a larger irradiation area to meet the needs of large illumination area, and the magnetic valve control system 30A can control the lighting modes of the three lights.

Figure 11:
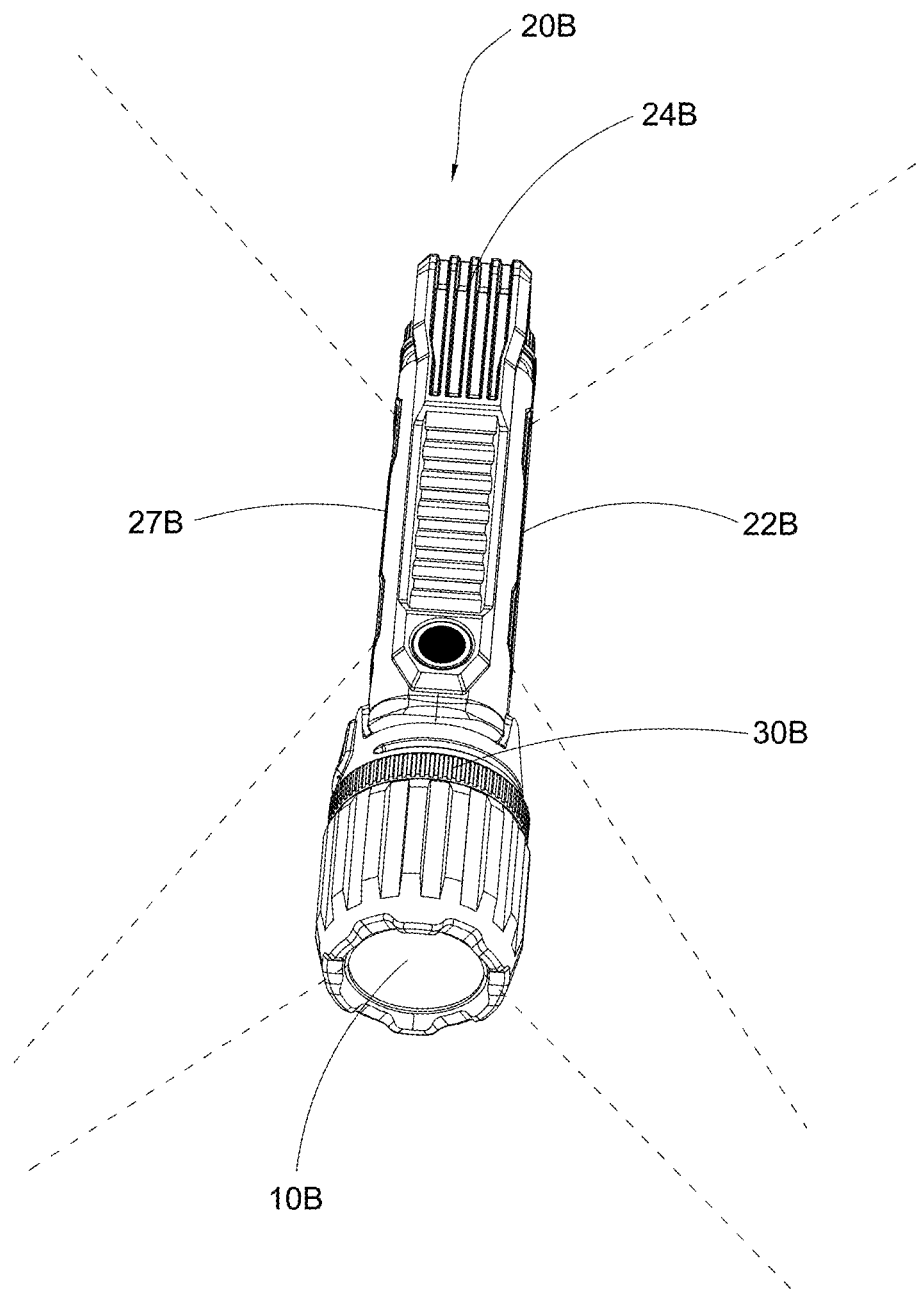
FIG. 11 is a schematic view of a multi-sided work light according to another preferred embodiment of the present invention.
Figure 12:
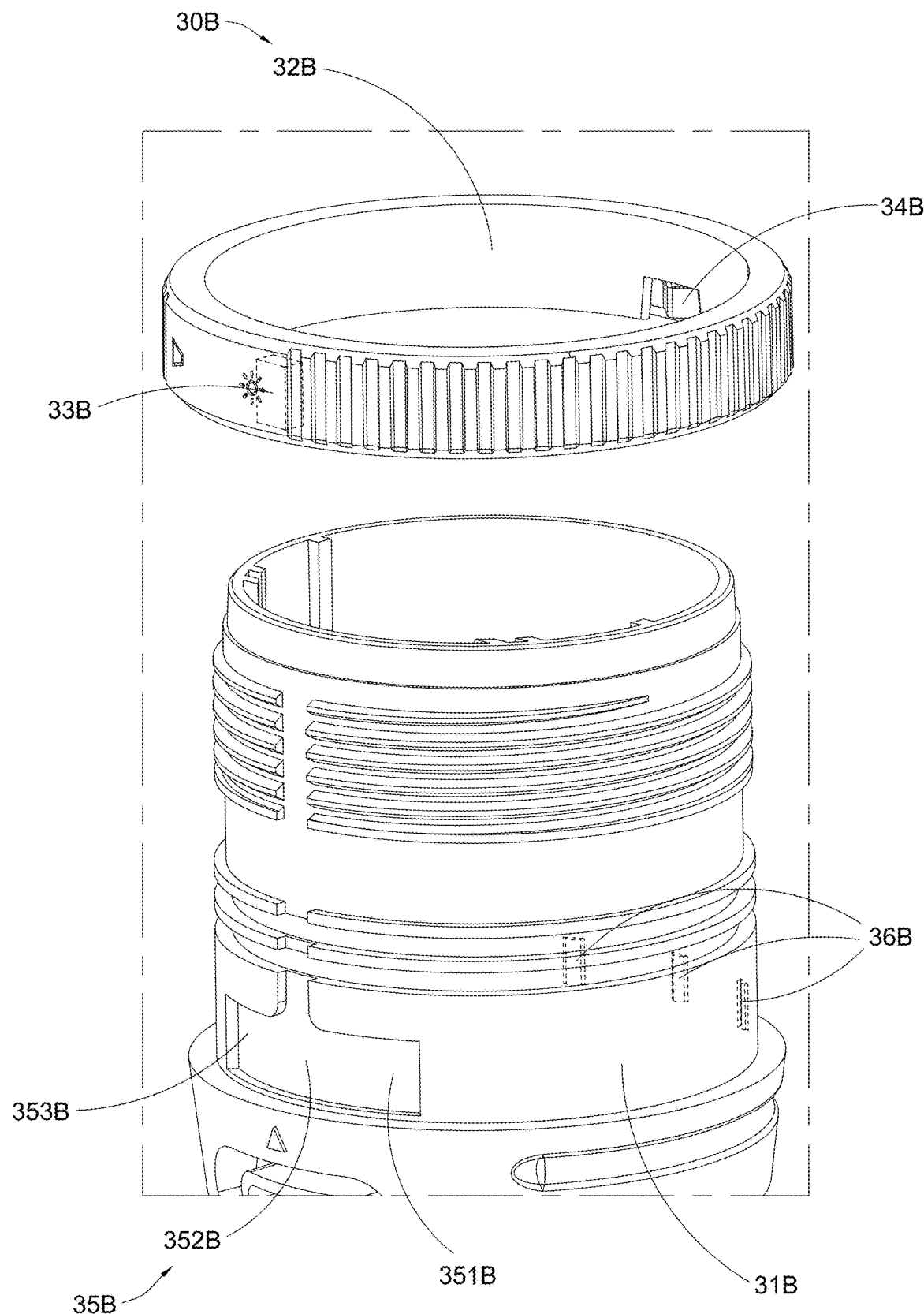
FIG. 12 This is a schematic view illustrating the magnetic valve control system of the multi-sided work light according to the above mentioned preferred embodiment of the present invention.

FIGS. 11 and 12 are respectively schematic view of another alternative mode of the present invention. In this modified embodiment, three lights are provided, that is, a second side lighting assembly 27B is added to the side of the work light body. The light head system 10B, the second side lighting assembly 27B and the side lighting assembly 22B are respectively disposed on the top and two sides of the work light, and the second side lighting assembly 27B and the side lighting assembly 22B are correspondingly arranged on two sides of the work light body to form a three-sided work light. The fixing assembly 24B is fixed when maintaining an angle of 0° with the work light body, which can form a larger illumination area that can be used in occasions with large illumination area requirements, and the magnetic valve control system 30B can control the lighting modes of the three lights.

The work light in the above embodiments of the present invention has good waterproof performance, a large illumination area and illumination angle, is compact in structure, easy to carry, has simple lighting mode switching operations, and has good waterproof performance with each component being closely fitted, can meet more needs and has a wide range of application scenarios.

As shown in FIG. 12, the magnetic valve control system 30B comprises a body portion 31B, a control ring 32B, a magnetic valve 33B, an elastic piece 34B, a sliding groove 35B and three limiting grooves 36B, wherein the body portion 31B is disposed on in the light body system 20B, the control ring 32B is rotatably sleeved on the outside of the body portion 31B, the magnetic valve 33B and the elastic piece 34B are correspondingly arranged inside the control ring 32B, the magnetic valve 33B is suitable for sliding along the sliding groove 35B and can be connected to the circuit board 12 at a predetermined position of the sliding groove 35B, the elastic piece 34B alternately and cyclically enters the limiting grooves 36B as the control ring 32B rotates.

The sliding groove 35B is divided into a headlight control area 351B, a first side light control area 352B and a second side light control area 353B, wherein the first side light control area 352B is located at a position between the headlight control area 351B and the second side light control area 353B, wherein the headlight control area 351B and the second side light control area 352B are far away from the OR switch 121, and the first side light control area 352B corresponds to the OR switch 121, wherein the magnetic valve 33B is respectively can be located in the headlight control area 351B, the first side light control area 352B and second side light control area 253B to connect with the circuit board, so as to activate the headlight and the two side lights respectively.

When the magnetic valve 33B is located at the headlight control area 351B, the headlight is activated; when the control ring 32B is rotated so that the magnetic valve 33B is located at the first side light control area 352B, the magnetic valve 33B is located at the first side light control area 352B. The valve 33B is relatively close to the OR switch 121 so as to magnetically attract the OR switch 121 to activate the side lighting assembly 22B; further rotate the control ring 32B so that when the magnetic valve 33B is located in the second side light control area 353B, the magnetic valve 33B is farther from the OR switch 121, the OR switch 121 is no longer attracted, and the second side lighting assembly 27B can be activated.

In this embodiment, by changing the sliding groove 35B and the corresponding number of the limiting grooves 36B, the opening and closing of the three lights can be controlled by rotating the control ring 32B. Those skilled in the art shall understand that under the concept of the present invention, more lights and more control areas can be set up at the sliding groove 35B. By rotating the control ring 32B, the magnetic valve 33B is located in different control areas to control the opening and closing of multiple lights.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention comprises all modifications encompassed within the spirit and scope of the following claims.

What is claimed is:

1. A multi-sided work light, comprising:
a light head system;
a light body system, the light body system comprises a side lighting assembly, a lamp body component and a power supply component, the light head system and the side lighting assembly are connected to the lamp body component, the power supply component is electrically connected to the side lighting assembly and the light head system to provide power to the light head system and the side lighting assembly; and
a magnetic valve control system which is arranged to control operation of the light head system and the side lighting module through a rotation operation.

2. The multi-sided work light, as recited in claim 1, further comprising a circuit board which is provided with an OR switch, wherein the magnetic valve control system comprises a control ring and a magnetic valve arranged on the control ring for magnetically coupling with the OR switch, wherein the control ring is capable of being rotated to change a relative position between the magnetic valve and the OR switch for turning on one of the light head system and the side lighting assembly while turning off the other.

3. The multi-sided work light, as recited in claim 2, wherein the magnetic valve control system further comprises a body portion which is connected between the light head system and the light body system, wherein the control ring is sleeved on an outside of the body portion.

4. The multi-sided work light, as recited in claim 3, wherein the magnetic valve control system further comprises an elastic piece and has a sliding groove and two limiting grooves, wherein the magnetic valve and the elastic piece are arranged on an inner surface of the control ring, the sliding groove and the two limiting grooves are provided at the body portion, the magnetic valve is configured to reciprocate along the sliding groove, the elastic piece is configured to be alternately retained at the two limiting grooves when the control ring is rotated to align the elastic piece with one of the two limiting grooves.

5. The multi-sided work light, as recited in claim 4, wherein the sliding groove is divided into a plurality of control areas, and the magnetic valve controls opening and closing of the light head system and the side lighting assembly through magnetic attraction between the magnetic valve at different control areas and the OR switch.

6. The multi-sided work light, as recited in claim 5, wherein when the control ring is rotated clockwise or counterclockwise, the magnetic valve moves along the sliding groove, and the elastic piece is alternately limited by the two limiting grooves, so that the magnetic valve magnetically interacts with the OR switch, wherein when the control ring is rotated, the elastic piece is located in one of the two limiting grooves, and the magnetic valve is located in one of the control areas in the sliding groove while the OR switch interacts with the magnetic valve to turn on one of the light head system and the side lighting assembly, wherein when the control ring is rotated again so that when the elastic piece is located in the other limiting groove, the magnetic valve is located in another control area of the sliding groove while the OR switch interacts with the magnetic valve to turn on the other of the light head system and the side lighting assembly, so that the light head system and the side lighting assembly are alternately turned on and off.

7. The multi-sided work light, as recited in claim 6, further comprising a control switch which is electrically connected to the light head system and the light body system for controlling lighting modes of the light head system and the light body system by a number of pressing times on the control switch.

8. The multi-sided work light, as recited in claim 4, further comprising a sealing component connected to the lamp body component, wherein the sealing component has a sliding passage, the sliding passage is communicated with the sliding groove, and the magnetic valve is adapted to enter the sliding groove along the sliding passage.

9. The multi-sided work light, as recited in claim 2, further comprising a sealing component connected to the lamp body component, wherein the sealing component comprises a sealing body, at least one sealing ring and multiple sets of sealing threads and has at least one sealing groove, wherein the sealing threads and the sealing groove are annularly arranged on an outer wall of the sealing body, wherein the sealing ring is detachably connected to the corresponding sealing groove, wherein the light head system comprises a protective shell, and multiple circles of limiting threads are provided inside the protective shell for engaging with the sealing threads.

10. The multi-sided work light, as recited in claim 8, wherein the sealing component comprises a sealing body, at least one sealing ring and multiple sets of sealing threads and has at least one sealing groove, wherein the sealing threads and the sealing groove are annularly arranged on an outer wall of the sealing body, wherein the sealing ring is detachably connected to the corresponding sealing groove, wherein the light head system comprises a protective shell, and multiple circles of limiting threads are provided inside the protective shell for engaging with the sealing threads.

11. The multi-sided work light, as recited in claim 9, wherein the light head system comprises a headlight, the circuit board, a reflective element, a heat dissipation bracket and a transparent cover, wherein the transparent cover is connected to the protective shell, and the headlight is electrically connected to the circuit board, the reflective element and the heat dissipation bracket are installed in the sealing body.

12. The multi-sided work light, as recited in claim 11, wherein a stopper is provided on an outer wall of the transparent cover, and the stopper is located between the transparent cover and the protective shell.

13. The multi-sided work light, as recited in claim 11, wherein an inner wall of the sealing body is provided with at least one mounting groove and one guide rail at intervals, an outer wall of the transparent cover is provided with at least one mounting slide rail which is engaged with the at least one mounting groove, and a side of the circuit board is provided with at least one guide groove which is engaged with the at least one guide rail.

14. The multi-sided work light, as recited in claim 8, wherein the lamp body component comprises a lamp body, a housing connected to the lamp body, a mounting portion and a side light mounting slot for holding the side lighting assembly, wherein the mounting portion is arranged on an upper portion of the lamp body, and the magnetic valve control system is mounted to the lamp body through the mounting portion, the sealing component is connected to a top of the lamp body.

15. The multi-sided work light, as recited in claim 14, wherein the side lighting assembly comprises a side light, a substrate, a heat dissipation plate, a side light reflector and a side light housing, wherein the side light is installed on the substrate which is connected to the heat dissipation plate and the side light reflector, the side light housing is connected to the lamp body, and the side light, the substrate, the heat dissipation plate and the side light reflector are fixed at the side light mounting slot.

16. The multi-sided work light, as recited in claim 14, wherein the light body system further comprises a fixing assembly which is rotatably connected to the lamp body component, wherein the fixing assembly is configured for being fixed to an object through magnetic attraction.

17. The multi-sided work light, as recited in claim 2, further comprising a second side lighting assembly connected to the lamp body component.

18. The multi-sided work light, as recited in claim 2, wherein the magnetic valve control system further comprises an elastic piece and has a sliding groove and three limiting grooves, wherein the magnetic valve and the elastic piece are arranged on an inner surface of the control ring, the sliding groove and the three limiting grooves are provided at the body portion, the magnetic valve is configured to reciprocate along the sliding groove, the elastic piece is configured to be alternately retained at the three limiting grooves when the control ring is rotated to align the elastic piece with one of the three limiting grooves.

19. The multi-sided work light, as recited in claim 4, wherein the sliding groove has a headlight control area and a side light control area, wherein when the magnetic valve is located in the headlight control area of the sliding groove, the elastic piece is located in one limiting groove, wherein the magnetic valve is at a distance far away from the OR switch to activate the light head system; when the control ring is further rotated, the elastic piece enters into the other limiting groove, and the magnetic valve slides along the sliding groove to enter the side light control area of the sliding groove, wherein the magnetic valve is close to the OR switch to allow the magnetic valve to attract the OR switch and turn on the side lighting assembly.

20. The multi-sided work light, as recited in claim 3, wherein the body portion has one thick end portion and one thin end portion, and a protrusion is provided at a junction of the thick end portion and the thin end portion, wherein the control ring is sleeved on the body portion above the protrusion.

* * * * *